(12) United States Patent
Andersen et al.

(10) Patent No.: US 8,176,097 B2
(45) Date of Patent: May 8, 2012

(54) MAINTAINING DATA COHERENCY WITHIN RELATED MULTI-PERSPECTIVE USER INTERFACES VIA SESSION-LESS QUERIES

(75) Inventors: Janet S. Andersen, Durham, NC (US); Scott B. Greer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 12/348,048

(22) Filed: Jan. 2, 2009

(65) Prior Publication Data

US 2010/0174991 A1 Jul. 8, 2010

(51) Int. Cl.
*G06F 17/30* (2006.01)
(52) U.S. Cl. ....................................................... 707/805
(58) Field of Classification Search .................. None
See application file for complete search history.

(56) References Cited

U.S. PATENT DOCUMENTS

| | | | |
|---|---|---|---|
| 6,065,117 A * | 5/2000 | White | 713/159 |
| 2002/0083034 A1* | 6/2002 | Orbanes et al. | 707/1 |
| 2003/0145089 A1* | 7/2003 | Edwards et al. | 709/228 |
| 2004/0117798 A1* | 6/2004 | Newman et al. | 719/310 |

* cited by examiner

*Primary Examiner* — Bai D. Vu
(74) *Attorney, Agent, or Firm* — Patents on Demand P.A.; Brian K. Buchheit; Scott M. Garrett

(57) ABSTRACT

A contextual data server can provide a contextual data response for a contextual data request. A contextual data response can include at least client-requested data for the contextual data request and contextual differences data. The context-enhanced multi-perspective user interface can present the client-requested data received from the contextual data server in at least two related data viewing areas. Synchronization of the client-requested data presented in the at least two related viewing areas can be maintained using a presentation context, which is a part of the context-enhanced multi-perspective user interface that is not visually rendered.

15 Claims, 3 Drawing Sheets

MAINTAINING DATA COHERENCY WITHIN RELATED MULTI-PERSPECTIVE USER INTERFACES VIA SESSION-LESS QUERIES

BACKGROUND

The present invention relates to the field of data coherency, and, more particularly, to maintaining data coherency within related multi-perspective user interfaces (UIs) via session-less queries.

Data analysis often involves a multitude of related data sets. Presenting such related data sets in an intuitive manner within a user interface is a challenge, particularly in a service-oriented architecture (SOA) environment. A popular technique is to display the related data in multiple perspectives or data views. However, displaying the related data in separate areas introduces the problem of maintaining the coherency between the related data being shown, especially when the data sets are time-sensitive.

For example, a network administrator views a network topology in a primary data view area and the data for Node A in a subordinate data view of the user interface. While the administrator is viewing this snapshot of information, values for the viewed data have more than likely changed. If the administrator executes a command that modifies the data of the subordinate data view, the data of primary data view should be updated to reflect any changes that have occurred. Otherwise, the contents of the primary data view remain static. An administrator can erroneously use this static data, which may be inconsistent with the newer data shown in the subordinate data view, to make current decisions.

A variety of approaches has been developed in the attempt to address the problem of maintaining data coherency. One such approach is the use of a user interface server. A user interface server is a specialized, and often complex, computing process that handles tasks for maintaining data coherency. Generally, a user interface (UI) server interacts with various components of the computing environment utilizing a subscription process. Conventional UI servers are state-full and session-full in that they maintain a session state for each of the user interfaces and user interface views that they manage. Additionally, a state-full, session-full UI server is not inherently compatible with every application having a multi-perspective user interface, due to the complexities of the UI, application, and/or the UI server. Thus, a single "generic" UI server cannot be easily adapted for all situations. Moreover, the complexity and additional resource and maintenance cost of this solution (using a conventional state-full, session-full UI server) is often prohibitive or cannot be cost justified for many situations.

Another approach is to force the update of data displayed in the primary data view every time a command alters the data displayed in the subordinate data view. While this approach addresses the problem, it incurs additional overhead that degrades overall performance.

An alternative approach is to forego the use of multiple display areas and have the lower-level data view replace the existing view. This eliminates the issue of data coherency at the cost of usability and overall effectiveness. A user is no longer able to view multiple data sets and, thus, required to remember relationships from the previous view or continuously reload data views.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION

Figure 1:
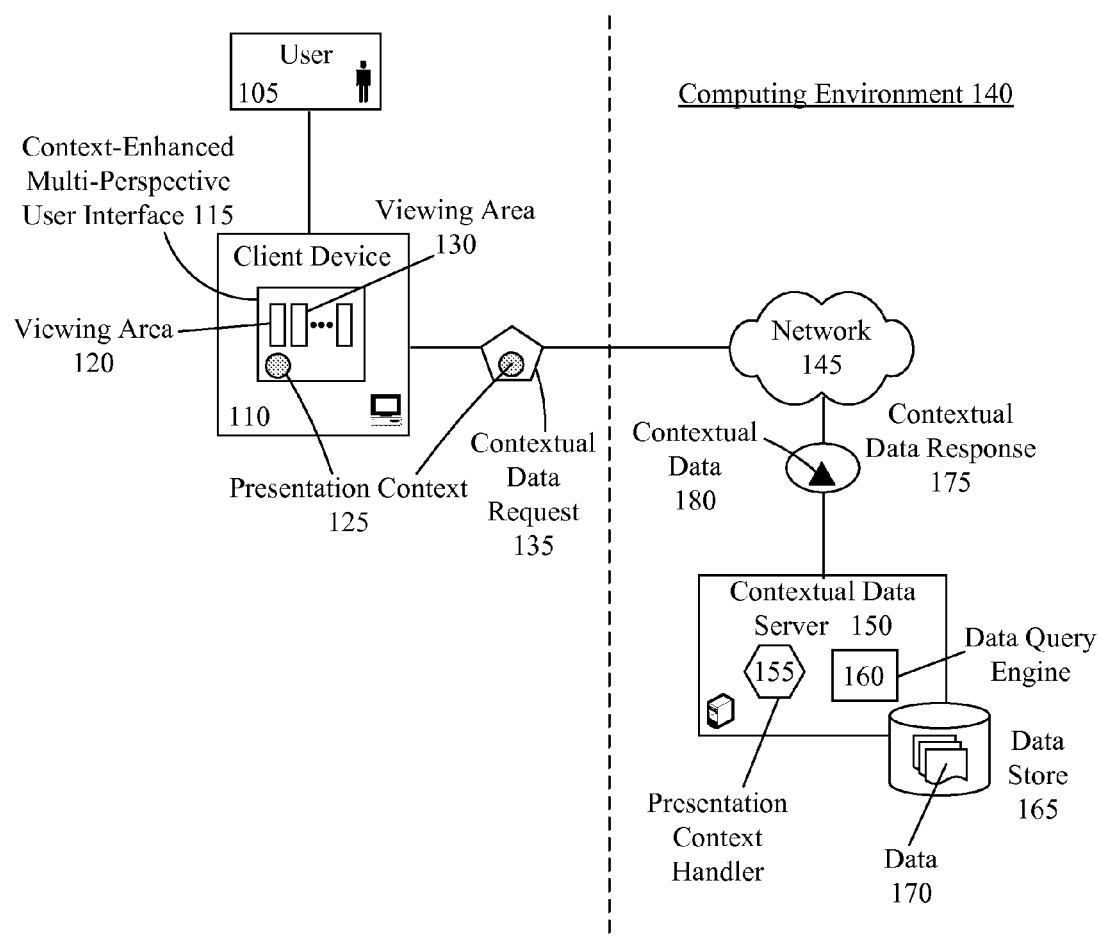
FIG. 1 is a schematic diagram illustrating a system for maintaining the coherency of data displayed in a context-enhanced multi-perspective user interface in accordance with embodiments of the inventive arrangements disclosed herein.

The present invention discloses a solution that can maintain the coherency of data displayed in two or more related data viewing areas of a context-enhanced multi-perspective user interface. An opaque section, which can be a section that is not visually shown, can maintain state information for the user interface. Queries can be conveyed from a client to a state-less, session-less contextual data server. These queries can include the data of the opaque section. Query results can include updates for the data viewing area which issued the query, as well as any other data viewing areas that include data that is to be updated to maintain data coherency in light of the changes to the related data viewing area. Thus, data coherency can be maintained among multiple related views in a system that uses a state-less, session-less contextual data server (as opposed to a traditional state-full session-full user interface (UI) server).

For example, in one embodiment, a relationship among data viewing areas can be hierarchical, where one data viewing area can be a subordinate viewing area of a master viewing area, which is a parent in the hierarchy. In such an embodiment, a presentation context can be associated with an opaque section the master viewing area. When a request is submitted to the contextual data server for the subordinate viewing area, data contained in the presentation context can be included. The presentation context can be used by the contextual data server to determine if changes have occurred to the data being presented in the master viewing area. In one embodiment, changes in data can be sent to the context-enhanced multi-perspective user interface as contextual differences data, which the context-enhanced multi-perspective user interface can apply to the presentation context to alter the presentation of the data for the master viewing area. In another embodiment, any updates can be provided by the server to the user interface in the same format used to originally populate each viewing area that is updated responsive to a request.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer usable storage medium having computer usable program code embodied in the medium. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Examples of a computer readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer usable or computer readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 for maintaining the coherency of data 170 displayed in a context-enhanced multi-perspective user interface 115 in accordance with embodiments of the inventive arrangements disclosed herein. In system 100, a user 105 can utilize the context-enhanced multi-perspective user interface 115 running on a client device 110 to view data 170.

The client device 110 can represent a variety of electronic computing devices capable of executing the context-enhanced multi-perspective user interface 115 and communicating with the contextual data server 150 over a network 145. In one embodiment, the interfaces 115 can be interfaces of a service-oriented architecture (SOA) computing environment 140.

The context-enhanced multi-perspective user interface 115 can represent a software application configured to present related data 170 within a set of two or more related viewing areas, which include viewing areas 120 and 130. That is, the data 170 displayed in one viewing area can have a relationship with data displayed in one or more other viewing areas of the interface 115, such that a data update to one area can affect data to be presented in one or more other viewing areas.

System 100 can maintain coherency of any user interface 115 having two or more (2 ... N) views or perspectives of the same data. State information for data coherency is maintained by client device 110, which permits server 150 to be implemented in a state-less, session-less manner.

In one embodiment, a hierarchical relationship can exist between viewing areas 120 and 130, such that viewing area 120 is a hieratical parent (referred to hereafter as a master viewing area) of viewing area 130 (referred to hereafter as a subordinate viewing area). The master viewing area 120 can refer to the viewing area that acts as a general data 170 display. The subordinate viewing area 130 can refer to the viewing area that displays detailed data 170 that can be directly related to a specific user-selected element of the master viewing area 120.

For example, the user 105 can view a network topology in the master viewing area 120 that provides real-time data 170 of the various displayed nodes, such as latency and load. Selection of a node of the network displayed in the master viewing area 120 can display the corresponding specific node data in the subordinate viewing area 130.

Presentation context 125 helps solve problems present in conventional systems that occur when information displayed in different viewing area become out-of-sync. This can traditionally occur when the user continues to select items to view in the one viewing area which is updated, while other viewing areas containing related data are not updated.

Expanding upon the networking example, while the user of a conventional system assesses node data, various data values of other nodes in the network may have changed. The user of a conventional system having data coherency problems can be unaware of this discrepancy in data coherency which can lead the user to make decisions based upon the out-of-date information of the master viewing area even though the out-of-date information is likely to be inconsistent with newer data shown in the subordinate view. To ensure data coherency of the data 170 displayed in the master viewing area 120 and subordinate viewing area 130, the context-enhanced multi-perspective user interface 115 can utilize a presentation context 125.

In one embodiment, the presentation context can contain data for each viewing area 120, 130 of the user interface 115. In another embodiment, different presentation contexts 125 can be maintained within different viewing areas 120-130. For instance, in a hierarchical example, a presentation context 125 for immediate children (subordinate viewing area(s)) can be maintained within each master viewing area.

The identifying elements contained in the presentation context 125 are not visually displayed or rendered within a user interface 115, but instead are opaque to any of the viewing areas 120, 130. The presentation context 125 can include data defining a current state/status of objects in each viewing area 120. For example, the presentation context 125 can include identifier/value pairs for the data 170 displayed in the viewing areas 120, 130. Continuing with the networking example, the presentation context 125 of the network topology shown in viewing area 120 can include an identifier for each node of the network with the associated values for latency and load.

The information displayed in one of the viewing areas 120, 130 and, therefore, contained in the presentation context 125 represents a snapshot of the data 170 at the time when the user 105 executed the command to view the data 170 in the context-enhanced multi-perspective user interface 115. Any command executed by the user 105 at later time that changes the data 170 displayed in one of the viewing areas 120, 130, such as a refresh or display of a new set of data 170, will automatically alter/update the display and/or presentation context 125. The context-enhanced multi-perspective user interface 115 can cache the presentation context 125 in a local memory location (not shown).

In a hierarchical embodiment, when the user 105 executes a command to view data 170 in the subordinate viewing area 130, the context-enhanced multi-perspective user interface 115 can generate a contextual data request 135. The contextual data request 135 can include the presentation context 125 of the master viewing area 120 associated with the subordinate viewing area 130 in addition to the standard information required to request data 170, such as a query identifier, a query string, etc.

Conveyance of the contextual data request 135 to the contextual data server 150 via the network 145 can be performed using standard communication protocols for computing environment 140. For example, in an implementation where environment 140 is a SOA environment, the communication protocols can conform to SOA standards. The contextual data server 150 can represent the hardware and/or software required to process the contextual data request 135 and provide the context-enhanced multi-perspective user interface 115 with a contextual data response 175. Contextual data server 150 need not maintain session and/or state data for client devices 110 in order to maintain data coherency among the viewing areas 120, 130 of a context enhanced multi-perspective user interface 115.

The contextual data server 150 can include a presentation context handler 155, a data query engine 160, and a data store 165 of data 170. The presentation context handler 155 can represent a software component of the contextual data server 150 that performs operations related to presentation contexts 125.

In an alternate embodiment, the data store 165 of data 170 can be remotely located from, but accessible by the contextual data server 150. In such an embodiment, the contextual data server 150 can access the data 170 over the network 145 using standard data communication protocols.

When the contextual data server 150 receives a contextual data request 135, the presentation context handler 155 can determine if the data 170 being presented in each viewing area 120, 130 needs to be updated. Should there be a need to update the display of one of the viewing areas 120, 130 the presentation context handler 155 can generate contextual data 180. In one embodiment, the contextual data 180 can be provided in the same format as that originally used to populate the viewing area 120, 130. In another embodiment, the contextual data 180 can be optimized so that only changes or deltas to one or more viewing area 120, 130 are included in server 150 conveyed responses 175.

The contextual data 180 can be a simple representation of changes for the data values displayed in a viewing area 120, 130. For example, the contextual data 180 can be a delimited list of data-value sets. In one implementation, the contextual data 180 can be a subset of normal results for a full query for the corresponding view. Following the previous networking example, the contextual data 180 can identify a network node and the data-value pairs that differ from the values contained in the presentation context 125 of the contextual data request 135.

To determine if updates to the presentation context 125 of one of the viewing areas 120, 130 are required, the presentation context handler 155 can utilize the data query engine 160 to retrieve the current values from the data 170 contained within the data store 165. The data query engine 160 can correspond to a software component of the contextual data server 150 that can interrogate the data 170 for specified input parameters. The data query engine 160 can also be utilized by the contextual data server 150 to retrieve the data 170 specified in the contextual data request 135.

Once processing of the contextual data request 135 is complete, the contextual data server 150 can generate a contextual data response 175. The contextual data response 175 can contain the data 170 requested by the contextual data request 135 and the contextual differences data 180 determined by the presentation context handler 155. The contextual data server 150 can then convey the contextual data response 175 to the context-enhanced multi-perspective user interface 115.

Upon receipt of the contextual data response 175, the context-enhanced multi-perspective user interface 115 can display the user-requested data 170 in the viewing area 120, 130, which issued the request 135. The context-enhanced multi-perspective user interface 115 can then apply the contextual data 180 to the presentation context 125. The display of the affected viewing areas 120, 130 that did not issue the request 135 can then be modified to reflect the changes applied to the presentation context 125.

For example, if Node A had a latency value of 15 ms and the contextual differences data 180 indicated that the latency value of Node A should be changed to 5 ms, the latency value for Node A would be changed to 5 ms in the presentation context 125 and the corresponding value in all affected viewing areas 120, 130 would also be changed to reflect a value of 5 ms.

Network 145 can include any hardware/software/and firmware necessary to convey data encoded within carrier waves. Data can be contained within analog or digital signals and conveyed though data or voice channels. Network 145 can include local components and data pathways necessary for communications to be exchanged among computing device components and between integrated device components and peripheral devices. Network 145 can also include network equipment, such as routers, data lines, hubs, and intermediary servers which together form a data network, such as the Internet. Network 145 can also include circuit-based communication components and mobile communication components, such as telephony switches, modems, cellular communication towers, and the like. Network 145 can include line based and/or wireless communication pathways.

As used herein, presented data store 165 can be a physical or virtual storage space configured to store digital information. Data store 165 can be physically implemented within any type of hardware including, but not limited to, a magnetic disk, an optical disk, a semiconductor memory, a digitally encoded plastic memory, a holographic memory, or any other recording medium. Data store 165 can be a stand-alone storage unit as well as a storage unit formed from a plurality of physical devices. Additionally, information can be stored within data store 165 in a variety of manners. For example, information can be stored within a database structure or can be stored within one or more files of a file storage system, where each file may or may not be indexed for information searching purposes. Further, data store 165 can utilize one or more encryption mechanisms to protect stored information from unauthorized access.

Figure 2:
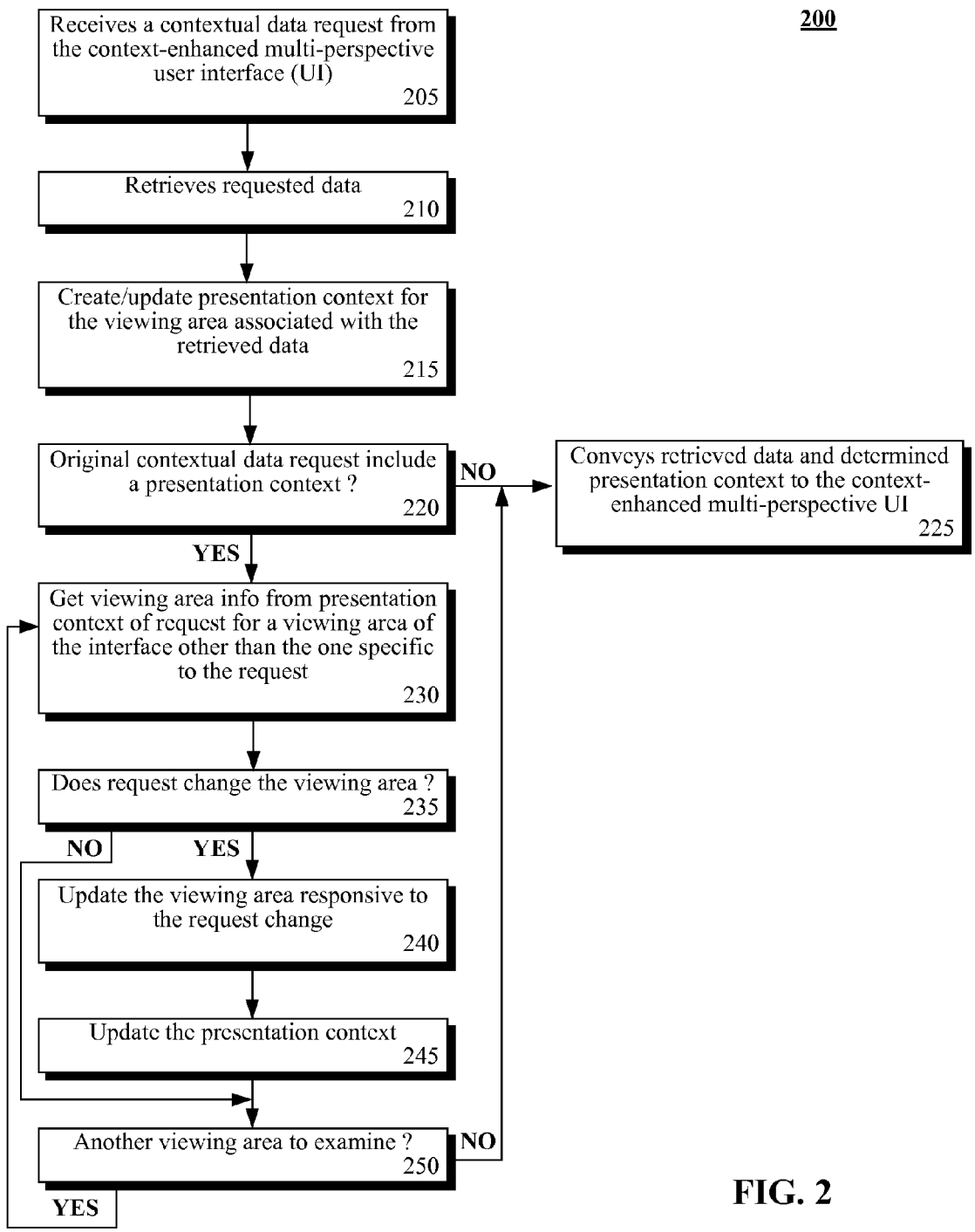
FIG. 2 is a flow chart of a method detailing the handling of a contextual data request by a contextual data server in accordance with an embodiment of the inventive arrangements disclosed herein.

FIG. 2 is a flow chart of a method 200 detailing the handling of a contextual data request by a contextual data server in accordance with an embodiment of the inventive arrangements disclosed herein. Method 200 can be performed in the context of system 100 or any other system that utilizes a presentation context to maintain data coherency between viewing areas of a context-enhanced multi-perspective user interface.

Method 200 can begin with step 205 where the contextual data server can receive a contextual data request from the context-enhanced multi-perspective user interface. The contextual data server can retrieve the requested data in step 210. In step 215, a presentation context can be created and/or updated for the viewing areas associated with the retrieved data.

The contextual data server can determine if the contextual data request included a presentation context in step 220. When the contextual data request does not contain a presentation context, as would be the case if the user is requesting data that is to be displayed in the master viewing area of a hierarchical implementation, then step 225 can execute where the contextual data server can convey the retrieved data and determined presentation context to the context-enhanced multi-perspective user interface. The retrieved data and determined presentation context can be a variation of the contextual data response 175 of system 100.

When the contextual data request does include a presentation context, step 230 can execute. In step 230, viewing area information can be acquired from the presentation context of the request for a viewing area of the interface other than the one corresponding to the request. In step 235, it can be determined whether the selected viewing area needs to be updated. When the viewing area does not require updating, method 200 can skip to step 250.

When the viewing area does require updating, the viewing area can be updated responsive to the change occurring as a result of the request, as shown by step 240. In step 245, the presentation context can be updated. If another viewing area is to be examined, the method can progress from step 250 to step 235, where the next viewing area can be updated as needed. When all viewing areas of the user interface have been handled, step 255 can execute, where a response to the request can be sent to the user interface.

Figure 3A:
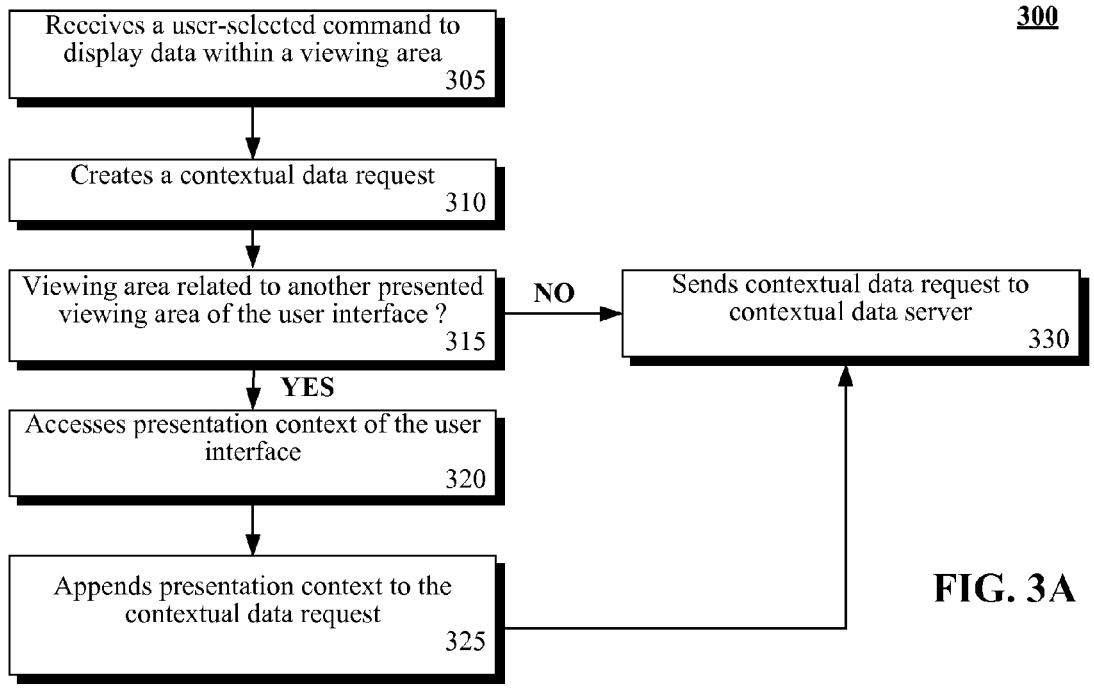
FIG. 3A is a flow chart of a method detailing the generation of a contextual data request by a context-enhanced multi-perspective user interface in accordance with an embodiment of the inventive arrangements disclosed herein.

FIG. 3A is a flow chart of a method 300 detailing the generation of a contextual data request by a context-enhanced multi-perspective user interface in accordance with an embodiment of the inventive arrangements disclosed herein. Method 300 can be performed in the context of system 100 and/or in conjunction with method 200 of FIG. 2.

Method 300 can begin with step 305 where the context-enhanced multi-perspective user interface can receive a user-selected command to display data within a viewing area. In step 310, the context-enhanced multi-perspective user interface can create a corresponding contextual data request.

It can be determined, in step 315, if the viewing area is related to another presented viewing area of the user interface. If not, a contextual data request can be sent to a contextual data server, as shown by step 330. When step 330 is triggered from step 315, the portion of the contextual data request typically reserved for the presentation context can be left blank. Alternately, in this situation, method 300 can be altered to include a step to include an indication within the contextual data request to signify that the presentation context has been intentionally omitted or that the target display is the master viewing area.

When a data relationship exists among viewing areas, a presentation context of the user interface can be accessed, as shown by step 320. In step 325, the presentation context can be appended to the contextual data request. Once appended, the contextual data request can be conveyed to the server in step 330.

Figure 3B:
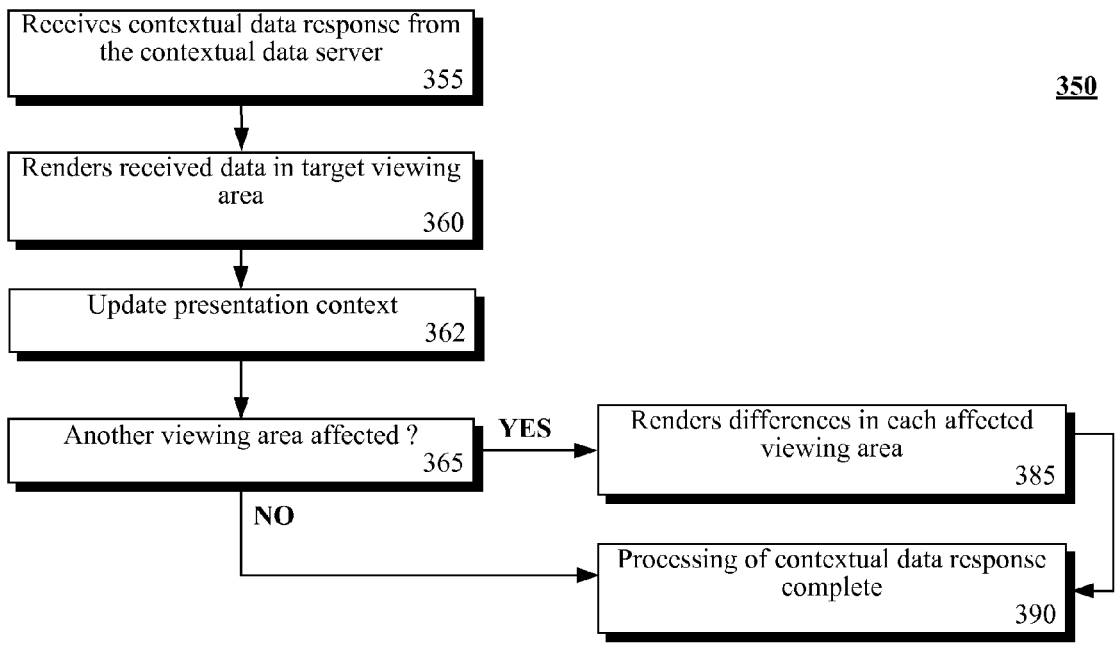
FIG. 3B is a flow chart of a method detailing the handling of a contextual data response by a context-enhanced multi-perspective user interface in accordance with an embodiment of the inventive arrangements disclosed herein.

FIG. 3B is a flow chart of a method 350 detailing the handling of a contextual data response by a context-enhanced multi-perspective user interface in accordance with an embodiment of the inventive arrangements disclosed herein.

Method 350 can be performed in the context of system 100 and/or in conjunction with methods 200 and/or 300.

Method 350 can begin with step 355 where the context-enhanced multi-perspective user interface can receive a contextual data response from the contextual data server. In step 360, the context-enhanced multi-perspective user interface can render the received data in the target viewing area.

It can be determined, in step 365, if another viewing area is affected by the received data. If not, flow can proceed to step 390 and the completion of the processing of the contextual data response by the context-enhanced multi-perspective user interface.

When at least one other viewing area is affected in step 365, each affected viewing area can be updated. In one implementation, only deltas or contextual differences can be conveyed to a client, in which case view changes needed will have to be determined before each affected view can be updated. Flow can proceed to step 390 and the completion of the processing of the contextual data response by the context-enhanced multi-perspective user interface.

The diagrams in FIGS. 1-3B illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for maintaining the coherency of data displayed in a context-enhanced multi-perspective user interface comprising:
receiving a contextual data request for client-requested data from a context-enhanced multi-perspective user interface by a contextual data server, wherein the client-requested data is to be displayed in a first viewing area of the context-enhanced multi-perspective user interface, wherein the first viewing area is related to a second viewing area of the context-enhanced multi-perspective user interface application, wherein the contextual data request comprises a presentation context, which includes state information related to the first viewing area and the second viewing area;
producing results for the contextual data request which updates the first viewing area;
determining based upon the presentation context whether the second viewing area is to be changed due to the produced results;
selectively generating a second viewing area update only when the second viewing area is to be changed;
providing the produced results and the second viewing area update when generated to a client that issued the contextual data request, wherein the contextual data request comprises at least an identifier for the client-requested data and the presentation context for the data presentation of the second viewing area, wherein the presentation context is independent of session data and state data of the context-enhanced multi-perspective user interface;
wherein the presentation context is maintained in an opaque section of the context-enhanced multi-perspective user interface, wherein the opaque section is not rendered, wherein the contextual data server is a session-less and state-less data server, wherein served data from the contextual data server resolves coherency problem between the first viewing area and the second viewing area.

2. The method of claim 1, wherein the second viewing area is not to be changed, and wherein no second viewing area update is conveyed to the client.

3. The method of claim 1, wherein the second viewing area is to be changed, and wherein the second viewing area update is conveyed to the client.

4. The method of claim 1, further comprising:
rendering of the produced results within the first viewing area of the context-enhanced multi-perspective user interface; and
updating the presentation context of the context-enhanced multi-perspective user interface in accordance with the produced results.

5. The method of claim 4, further comprising:
selectively rendering the second viewing area when the second viewing update is received by the client.

6. The method of claim 1, wherein said contextual data server is a stateless, session-less server configured to provide user interface updates.

7. The method of claim 1, wherein the relationship between the first viewing area and the second viewing area is a hierarchical one.

8. The method of claim 7, wherein the first viewing area is a subordinate viewing area, wherein the second viewing area is a master viewing area, and wherein the presentation context is part of the master viewing area that is not rendered directly when the master viewing area is visually presented.

9. The method of claim 1, wherein the first viewing area and the second viewing area are concurrently presented within the multi-perspective user interface.

10. A system for maintaining the coherency of data displayed in a context-enhanced multi-perspective user interface comprising:
- a contextual data server configured to provide a contextual data response for a contextual data request, wherein the contextual data response comprises at least client-requested data for the contextual data request and contextual differences data; and
- a context-enhanced multi-perspective user interface configured to present the client-requested data received from the contextual data server in at least two related data viewing areas, wherein synchronization of the client-requested data presented in the at least two related viewing areas is maintained using a presentation context, wherein the presentation context includes state information related to the at least two related data viewing areas, wherein the presentation context is processed by the contextual data server as part of queries for any of the related data viewing areas, wherein the contextual data server is configured to utilize the presentation context to determine when viewing areas other than one corresponding to a contextual data request are affected by the contextual data request and are to be updated responsive to the contextual data request;
- wherein the contextual data request comprises at least an identifier for the client-requested data and the presentation context for the data presentation of the second viewing area, wherein the presentation context is independent of session data and state data of the context-enhanced multi-perspective user interface;
- wherein the presentation context is maintained in an opaque section of the context-enhanced multi-perspective user interface, wherein the opaque section is not rendered, wherein the contextual data server is a session-less and state-less data server, wherein served data from the contextual data server resolves coherency problem between the first viewing area and the second viewing area.

11. The system of claim 10, wherein the relationship between the at least two related viewing areas is that of a hierarchy, one of the data viewing areas being a subordinate viewing area and another of the data viewing areas being a master viewing area, wherein the subordinate viewing area is a child of the master viewing area in a hierarchy.

12. The system of claim 11, wherein the presentation context is associated with the master viewing area, and wherein the presentation context is not rendered directly when the master viewing area is visually presented.

13. A computer program product having computer usable program code embodied in a non-transitory computer-readable medium, when executed by a processor the computer usable program code configured to maintain the coherency of data displayed in a context-enhanced multi-perspective user interface, the computer program product comprising:
- computer usable program code configured to receive a contextual data request for client-requested data from a context-enhanced multi-perspective user interface by a contextual data server, wherein the client-requested data is to be displayed in a first viewing area of the context-enhanced multi-perspective user interface, wherein the first viewing area is related to a second viewing area of the context-enhanced multi-perspective user interface application, wherein the contextual data request comprises a presentation context, which includes state information related to the first viewing area and the second viewing area;
- computer usable program code configured to produce results for the contextual data request which updates the first viewing area;
- computer usable program code configured to determine based upon the presentation context whether the second viewing area is to be changed due to the produced results;
- computer usable program code configured to selectively generate a second viewing area update only when the second viewing area is to be changed;
- computer usable program code configured to provide the produced results and the second viewing area update when generated to a client that issued the contextual data request,
- wherein the contextual data request comprises at least an identifier for the client-requested data and the presentation context for the data presentation of the second viewing area, wherein the presentation context is independent of session data and state data of the context-enhanced multi-perspective user interface,
- wherein the presentation context is maintained in an opaque section of the context-enhanced multi-perspective user interface, wherein the opaque section is not rendered, wherein the contextual data server is a session-less and state-less data server, wherein served data from the contextual data server resolves coherency problem between the first viewing area and the second viewing area.

14. The computer program product of claim 13, wherein the first viewing area and the second viewing area are concurrently presented within the multi-perspective user interface.

15. The computer program product of claim 13, wherein the relationship between the first viewing area and the second viewing area is a hierarchical one, wherein the first viewing area is a subordinate viewing area, wherein the second viewing area is a master viewing area, and wherein the presentation context is part of the master viewing area that is not rendered directly when the master viewing area is visually presented.

* * * * *